(12) United States Patent
Ohmura et al.

(10) Patent No.: US 8,043,741 B2
(45) Date of Patent: Oct. 25, 2011

(54) SURFACE-TREATED STEEL PLATE FOR BATTERY CASE AND BATTERY CASE

(75) Inventors: Hitoshi Ohmura, Yamaguchi-ken (JP); Tatsuo Tomomori, Yamaguchi-ken (JP); Hideo Ohmura, Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 1241 days.

(21) Appl. No.: 10/965,738

(22) Filed: Oct. 18, 2004

(65) Prior Publication Data

US 2005/0112459 A1    May 26, 2005

Related U.S. Application Data

(63) Continuation of application No. 10/343,765, filed as application No. PCT/JP01/05245 on Jun. 20, 2001, now Pat. No. 6,979,515.

(30) Foreign Application Priority Data

Aug. 4, 2000  (JP) ................................ 2000-236695

(51) Int. Cl.
*H01M 2/00* (2006.01)
*H01M 2/04* (2006.01)
*H01M 2/02* (2006.01)

(52) U.S. Cl. .......................... 429/163; 429/176; 429/177

(58) Field of Classification Search .................. 428/679, 428/610, 647; 429/179, 163
See application file for complete search history.

(56) References Cited

U.S. PATENT DOCUMENTS 6,270,922 B1    8/2001  Ohmura et al.

FOREIGN PATENT DOCUMENTS

| EP | 0939448 A1 | 9/1999 |
| JP | 07-99686 B2 | 10/1995 |
| JP | 10-212595 | 8/1998 |
| WO | WO 97/42667 A1 | 11/1997 |
| WO | WO 97/44835 A1 | 11/1997 |
| WO | WO 98/10475 A1 | 3/1998 |
| WO | WO 00/65671 | 11/2000 |

OTHER PUBLICATIONS

Japanese Patent Abstract, JP 10-212595 a, published Aug. 11, 1998, entitled "Manufacture of battery can forming material and battery can made of the same forming material", applicant Katayama Tokushu Kogyo KK.

*Primary Examiner* — Helen O Conley
(74) *Attorney, Agent, or Firm* — Browdy and Neimark, PLLC

(57) ABSTRACT

A battery case excellent in glossiness of appearance and working efficiency and a surface-plated steel plate which can be used preferably to manufacture the battery case. The battery case is produced by deep-drawing, DI-forming, DTR-forming a surface-treated steel plate having glossy nickel or glossy nickel-cobalt alloy plating on the outermost layer corresponding to the external face of a battery case of a plated original plate consisting of a steel plate. The glossy nickel plating or glossy nickel-cobalt alloy plating layer on the outermost layer has a high glossiness, and therefore the appearance is excellent. The runnability of a formed battery case is high as well as the working efficiency.

5 Claims, No Drawings

SURFACE-TREATED STEEL PLATE FOR BATTERY CASE AND BATTERY CASE

RELATED APPLICATIONS

The present application is a continuation of parent application Ser. No. 10/343,765, nationalized Feb. 4, 2003, which was the U.S. national stage of international application PCT/JP 01/05245, filed Jun. 20, 2001.

TECHNICAL FIELD

The present invention relates to a container, in which an alkali liquid is enclosed, and more specifically, it relates to a surface-treated steel plate for an exterior case of a battery, such as an alkaline manganese battery, a nickel-cadmium battery and the like, and a battery case obtained by subjecting the surface-treated steel plate to a deep-drawing method, a DI-forming method or a DTR-forming method.

BACKGROUND ART

For a battery case enclosing a strong alkaline liquid for an alkaline manganese battery, a nickel-cadmium battery and the like, a method such that a cold-rolled steel strip is press-formed into a battery case and then subjected to barrel plating or a method such that a nickel plated steel strip is press-formed into a battery case have conventionally been employed.

In this way, for the use of battery, such as an alkaline manganese battery, a nickel cadmium battery and the like, nickel plating is used because nickel is strong for alkaline corrosiveness and these batteries mainly utilize strong alkali potassium hydroxide as electrolyte. Further, in the case battery is connected to an external terminal, nickel has stable contact resistance. Furthermore, there is an advantage in the manufacture of battery that nickel has excellent spot weldability, in which spot welding is carried out to weld each constituent parts to be assembled in a battery.

In order to increase battery capacity in recent years, a DI (drawing and ironing) forming method is used instead of a deep-drawing method (JP-B-7-99686) as a press-formed method for a battery case. In the DI-forming method and a DTR (drawing thin and redraw) method, anode and cathode active substances can be enclosed in a larger amount corresponding to a smaller thickness of the side wall of the case than the thickness of the bottom, and an advantage can also be obtained such that the pressure strength of the battery can be improved owing to the thick bottom of the case along with an increase of battery capacity.

Furthermore, the demand of an alkaline manganese battery and a nickel hydoride battery has increased in recent years, and automization of production of batteries is progressing accordingly. Owing thereto, a battery case having been press-formed is automatically conveyed to a battery case washing machine and a battery producing machine with a belt conveyor. However, in the case where the outer surface of the battery has poor slipping property, the battery case is stopped on the way in on the belt conveyor to delay supply of the battery case to the battery washing machine or the battery production process, whereby the working efficiency is deteriorated.

In recent years, with respect to battery cases produced by the deep-drawing method, the DI-forming method and the DTR-forming method, a large amount of the battery cases are placed on a belt conveyor and run by for producing batteries. However, they do not run smoothly with a conventional nickel plating on the outermost layer of the outer surface of the battery case, whereby the supply of the battery cases is liable to be intermittent. In particular, upon entering the battery cases running on the belt conveyor into a process step of arranging them into lines, clogging is liable to occur with the nickel on the outermost layer of the outer surface of the battery case.

A technical object of the invention is to provide a battery case that is excellent in glossiness and runnability, and a surface-treated steel plate that can be preferably used for producing the battery case.

DISCLOSURE OF THE INVENTION

In this connection, the inventors have found from the foregoing standpoint that in the case where a battery case produced by the deep-drawing method, the DI-forming method and the DTR-forming method has glossy nickel plating or glossy nickel-cobalt alloy layer on the outermost layer of the outer surface of the canister, the flowing property of the battery case on a belt conveyor is excellent. It is expected that the runnability of a battery case is good when the outer surface of the case is hard and has a small friction coefficient. Furthermore, it has been found that the addition of cobalt improves the glossiness of the plated surface.

In order to attain the object, a surface-treated steel plate for a battery case is characterized by having an iron-nickel diffusion layer as a lower layer and a nickel layer as an upper layer on a surface corresponding to an inner surface of the case, and an iron-nickel diffusion layer as a lower layer, a nickel layer as an intermediate layer and a glossy nickel plating layer as an upper layer on a surface corresponding to an outer surface of the case.

A surface-treated steel plate for a battery case is characterized by having an iron-nickel diffusion layer on a surface corresponding to an inner surface of the case, and an iron-nickel diffusion layer as a lower layer, a nickel layer as an intermediate layer and a glossy nickel plating layer as an upper layer on a surface corresponding to an outer surface of the case.

A surface-treated steel plate for a battery case is characterized by having an iron-nickel diffusion layer as a lower layer, a nickel layer as an intermediate layer and a nickel plating layer as an upper layer on a surface corresponding to an inner surface of the case, and an iron-nickel diffusion layer as a lower layer, a nickel layer as an intermediate layer and a glossy nickel plating layer as an upper layer on a surface corresponding to an outer surface of the case.

A surface-treated steel plate for a battery case is characterized by having an iron-nickel diffusion layer as a lower layer and a nickel plating layer as an upper layer on a surface corresponding to an inner surface of the case, and an iron-nickel diffusion layer as a lower layer, a nickel layer as an intermediate layer and a glossy nickel plating layer as an upper layer on a surface corresponding to an outer surface of the case.

A surface-treated steel plate for a battery case is characterized by having an iron-nickel diffusion layer as a lower layer and a nickel layer as an upper layer on a surface corresponding to an inner surface of the case, and an iron-nickel diffusion layer as a lower layer, a nickel layer as an intermediate layer and a glossy nickel alloy plating layer as an upper layer on a surface corresponding to an outer surface of the case.

A surface-treated steel plate for a battery case is characterized by having an iron-nickel diffusion layer on a surface corresponding to an inner surface of the case, and an iron-nickel diffusion layer as a lower layer, a nickel layer as an intermediate layer and a glossy nickel alloy plating layer as an upper layer on a surface corresponding to an outer surface of the case.

A surface-treated steel plate for a battery case is characterized by having an iron-nickel diffusion layer as a lower layer, a nickel layer as an intermediate layer and a nickel plating layer as an upper layer on a surface corresponding to an inner surface of the case, and an iron-nickel diffusion layer as a lower layer, a nickel layer as an intermediate layer and a glossy nickel alloy plating layer as an upper layer on a surface corresponding to an outer surface of the case.

A surface-treated steel plate for a battery case is characterized by having an iron-nickel diffusion layer as a lower layer and a nickel plating layer as an upper layer on a surface corresponding to an inner surface of the case, and an iron-nickel diffusion layer as a lower layer, a nickel layer as an intermediate layer and a glossy nickel alloy plating layer as an upper layer on a surface corresponding to an outer surface of the case.

The nickel plating layer may either be non-glossy nickel plating, semi-glossy nickel plating or glossy nickel plating. The glossy nickel alloy plating layer may be glossy nickel-cobalt plating. It is preferred that the thickness of the nickel layer is from 0.01 to 3 µm. It is preferred that the thickness of the nickel plating layer is from 0.2 to 3 µm. It is preferred that the thickness of the glossy nickel plating layer or the glossy nickel alloy plating layer is from 0.5 to 4 µm.

A battery case as claimed herein is a battery case characterized by being formed by subjecting a surface-treated steel plate for a battery case described above to a deep-drawing method, a DI-forming method or a DTR-forming method.

BEST MODE FOR CARRYING OUT THE INVENTION

With respect to the formation of the glossy nickel-cobalt alloy plating in the battery case and the surface-treated steel plate described in the foregoing, in the case where cobalt sulfate is added to a Watts bath or a sulfamic acid bath, cobalt is eutected with nickel, and as a result, an eutectoid plating layer increases in glossiness and increases in hardness of the plating film layer along with increase of the cobalt content in the plating film. Specifically, The plating glossiness of glossy nickel plating with a sulfuric acid bath is from 460 to 470 (according to the mirror surface glossiness measuring method, JIS Z8741) in the case of no cobalt added, whereas it increases to from 507 to 525 (according to the mirror surface glossiness measuring method, JIS Z8741) with a cobalt content of 1.0%, for example. Glossy nickel plating with no cobalt added also exerts the effect.

The invention can provide improvement of the runnability of canisters irrespective to the formation method of the battery case, for example, irrespective to a deep-drawing method, a DI-forming method or a DTR-forming method, and thus can be preferably used.

The cobalt content of the glossy nickel-cobalt alloy plating is preferably in a range of from 0.5 to 10%. When the cobalt content is less than 0.5%, there is no effect on improvement in glossiness or on runnability of canisters owing to the addition of cobalt, whereas in the case where the cobalt content exceeds 10%, the effect on runnability of canisters is saturated, and it is uneconomical as cobalt is an expensive noble metal. Glossy nickel plating added with a gloss agent, to which no cobalt is added, also exerts the effect.

The plating thickness of the surface-treated steel plate in the case of the glossy nickel plating or the glossy nickel-cobalt alloy plating of the invention is preferably in a range of from 0.5 to 4 µm on a side corresponding to an outer surface of the case.

When the thickness of the glossy nickel plating or the glossy nickel-cobalt alloy plating on the side of the outer surface of the case is less than 0.5 µm, there is no effect on improvement in glossiness or runnability of the battery case. When the plating thickness exceeds 4.0 µm, the effect of improvement in runnability of the battery case reaches saturation, and further thickening is uneconomical.

As a steel plate as a mother material for the surface-treated steel plate, i.e., a plated original plate, in general, a low-carbon aluminum killed steel is preferably used. Furthermore, a cold-rolled steel strip produced from a nonageing ultra-low carbon steel (less than 0.01% of carbon) with niobium and titanium added is also used.

The steel strip is then subjected, after cold-rolling, to electrolytic cleaning, annealing and tempering rolling in ordinary manners to make a plated original plate. Thereafter, nickel plating is made on both surface of the plated original plate. After the plating, a nickel-iron diffusion layer is formed by a thermal treatment. The thermal treatment is carried out under such conditions that a nickel-iron alloy layer is formed as the entire amount, or a nickel layer remains by 3 µm or less in thickness. For the object, a temperature of from 450 to 650° C. and a time of from 4 to 15 hours are preferred for a thermal treatment by a box type annealing method, and a temperature of from 600 to 850° C. and a time of from 0.5 to 3 minutes are preferred for a thermal treatment by a continuous annealing method.

Thereafter, glossy nickel plating or glossy nickel alloy plating is applied on a surface corresponding to an outer surface of a battery case. The glossy nickel alloy plating is preferably nickel-cobalt alloy plating.

As another method, after carrying out glossy nickel plating or glossy nickel alloy plating on a surface corresponding to an outer surface of a battery case as same as described in the foregoing, non-glossy nickel plating, semi-glossy nickel plating or glossy nickel plating is made on a surface corresponding to an inner surface. In the case where glossy nickel plating is carried out, it can be simultaneously carried out with the glossy nickel plating on the side of the outer surface. The plating thickness is preferably in a range of from 0.2 to 3 µm. When it is less than 0.2 µm, no effect is observed on improvement in battery performance, whereas when it exceeds 3 µm, the effect is saturated, and cost rise is brought about with an unnecessarily large thickness.

While the plating bath may be a known sulfate bath or sulfonamide bath, a sulfate bath is preferred as bath handling thereof is relatively convenient. Because the deposition ratio of cobalt and nickel in the plating film is higher by several times than the concentration ratio in the plating bath, it is possible that a nickel anode is used as an anode, and supply of cobalt ion is carried out by addition in the form of a sulfamate or a sulfate.

EXAMPLES

The invention will be further described in detail with reference to the following examples.

Low-carbon aluminum killed steel plates having a thickness of 0.25 mm and 0.4 mm having been subjected to cold rolling, annealing and temper rolling were used as a plated original plate, respectively. Ultra-low carbon aluminum killed steel plates having a thickness of 0.25 mm and 0.4 mm having been subjected to cold rolling were used as plated original plates. The steel chemical composition of both the plated original plates was as follows.

C: 0.04%
(percentage in terms of % by weight, hereinafter the same)
Si: 0.01%
Mn: 0.22%
P: 0.012%
S: 0.006%
Al: 0.048%
N: 0.0025%

The plated original plates were subjected to pretreatment including alkaline electrolytic degreasing, water washing, dipping in a solution containing a sulfuric acid and water washing in ordinary manners, and then subjected to ordinary non-glossy nickel plating.

(1) Non-Glossy Nickel Plating

Non-glossy nickel plating was carried out by using the following nickel sulfate bath.

| Bath composition | | |
|---|---|---|
| Nickel sulfate | $NiSO_4 \cdot 6H_2O$ | 300 g/L |
| Nickel chloride | $NiCl_2 \cdot 6H_2O$ | 45 g/L |
| Boric acid | $H_3BO_3$ | 30 g/L |
| Bath pH: | 4 (adjusted with sulfuric acid) | |
| Stirring: | Air stirring | |
| Bath temperature: | 60° C. | |

Anode: S Pellet (a trade name, produced by INCO Inc., spherical) charged in a titanium basket and covered with a polypropylene bag was used.

After the non-glossy nickel plating, a nickel-iron diffusion layer is formed by a thermal treatment. The thermal treatment was carried out under conditions of a non-oxidizing atmosphere of 6.5% of hydrogen with the balance of nitrogen gas and a dew point of −55° C. to make a nickel layer of from 0.01 to 3 μm remaining as the outermost layer or a nickel-iron alloy layer formed as the entire amount by appropriately changing the soaking time and the soaking temperature.

Furthermore, glossy nickel plating or glossy nickel-cobalt alloy plating was carried out on a surface corresponding to the outer surface of the battery case. The glossy nickel plating was carried out with the following glossy nickel-cobalt alloy plating bath, to which cobalt sulfate was not added.

(2) Glossy Nickel-Cobalt Alloy Plating

Cobalt sulfate was appropriately added to a nickel sulfate bath to make cobalt contained in a nickel plating layer.

| Bath Composition | | |
|---|---|---|
| Nickel sulfate | $NiSO_4 \cdot 6H_2O$ | 300 g/L |
| Nickel chloride | $NiCl_2 \cdot 6H_2O$ | 45 g/L |
| Cobalt sulfate | $CoSO_4 \cdot 6H_2O$ | (adlibitum) |
| Boric acid | $H_3BO_3$ | 30 g/L |
| Nitrogen-containing heterocyclic compound | | 0.6 g/L |
| Nitrogen-containing aliphatic compound | | 2.0 g/L |
| Bath pH: | 4 (adjusted with sulfuric acid) | |
| Stirring: | Air stirring | |
| Bath temperature: | 60° C. | |

Anode: S Pellet (a trade name, produced by INCO Inc., spherical) charged in a titanium basket and covered with a polypropylene bag was used. Under the foregoing conditions, the cobalt content and the plating thickness of the plating film were changed by changing the addition amount of cobalt sulfate and the electrolysis time. While good characteristics were obtained until the forgoing surface treatment, non-glossy nickel plating, semi-glossy nickel plating or glossy nickel plating may further be carried out on the inner surface of the battery case. The plating bath described in the foregoing can be used as a plating bath for non-glossy nickel plating. In the case of the glossy nickel plating, it may be carried out simultaneously with glossy nickel plating carried out on the outer surface of the battery case.

The following plating bath is used for semi-glossy nickel plating. The semi-glossy nickel plating may be carried out instead of the initial non-glossy nickel plating.

(3) Semi-Glossy Nickel Plating

Semi-glossy nickel plating was carried out by appropriately adding a polyoxyethylene adduct of an unsaturated alcohol and an unsaturated carboxylic acid formaldehyde as a semi-glossy agent.

| Bath composition | | |
|---|---|---|
| Nickel sulfate | NiSO4•6H2O | 300 g/L |
| Nickel chloride | NiCl2•6H2O | 45 g/L |
| Boric acid | H3BO3 | 30 g/L |
| Polyoxyethylene adduct of unsaturated alcohol | | 3.0 g/L |
| Unsaturated carboxylic acid formaldehyde | | 3.0 g/L |
| Bath pH: | 4 (adjusted with sulfuric acid) | |
| Stirring: | Air stirring | |
| Bath temperature: | 60° C. | |

Anode: S Pellet (a trade name, produced by INCO Inc., spherical) charged in a titanium basket and covered with a polypropylene bag was used.

(Production of Battery Case)

Production of a battery case by the DI-forming method was carried out in such a manner that the plated steel plate having a thickness of 0.4 mm was subjected to cupping from a blank diameter of 41 mm to a diameter of 20.5 mm, and then subjected to redrawing and two-step ironing forming with a DI-forming machine to be formed into an outer diameter of 13.8 mm, a case wall of 0.20 mm and a height of 56 mm. An upper part was finally trimmed to produce an LR6 type battery case having a height of 49.3 mm.

Production of a battery case by the DTR-forming method was carried out in such a manner that the plated steel plate having a thickness of 0.25 mm was punched to a blank diameter 58 mm and subjected to several times of drawing and redrawing to produce an LR6 type battery case having an outer diameter of 13.8 mm, a case wall of 0.20 mm and a height of 49.3 mm.

Furthermore, production of a battery case by the deep-drawing method was carried out in such a manner that the plated steel plate having a thickness of 0.25 mm was punched to a blank diameter 57 mm and subjected to several times of drawing and redrawing to produce an LR6 type battery case having an outer diameter of 13.8 mm, a case wall of 0.25 mm and a height of 49.3 mm.

TABLE 1

| Example or Comparative Example | Thickness (mm) | Inner surface or outer surface | Ni plating thickness (μm) | Soaking conditions on thermal treatment | Ni thickness on outermost layer (μm) | Plating Kind of plating | Plating Thickness (μm) | Battery canister production method | Flowing property of battery case | Discharging Characteristics |
|---|---|---|---|---|---|---|---|---|---|---|
| Example 1 | 0.40 | inner surface | 3.0 | 500° C. × 5 hours | 1.0 | — | — | DI forming | ○ | ○ |
|  |  | outer surface | 3.0 |  | 1.0 | glossy Ni-3% Co | 1.0 |  |  |  |
| Example 2 | 0.25 | inner surface | 2.5 | 450° C. × 15 hours | 1.0 | — | — | DTR forming | ○ | ○ |
|  |  | outer surface | 4.0 |  | 2.0 | glossy Ni-10% Co | 0.5 |  |  |  |
| Example 3 | 0.40 | inner surface | 1.0 | 650° C. × 4 hours | 0.0 | — | — | DI forming | ○ | ○ |
|  |  | outer surface | 2.0 |  | 1.0 | glossy Ni-0.5% Co | 3.0 |  |  |  |
| Example 4 | 0.25 | inner surface | 1.5 | 600° C. × 3 minutues | 1.0 | — | — | deep-drawing forming | ○ | ○ |
|  |  | outer surface | 4.0 |  | 2.0 | glossy Ni | 0.5 |  |  |  |
| Example 5 | 0.40 | inner surface | 4.0 | 850° C. × 0.5 minutes | 2.0 | — | — | DI forming | ○ | ○ |
|  |  | outer surface | 4.0 |  | 2.0 | glossy Ni | 3.0 |  |  |  |
| Example 6 | 0.40 | inner surface | 0.2 | 500° C. × 5 hours | 0.0 | non-glossy Ni | 1.0 | DI forming | ○ | ○ |
|  |  | outer surface | 4.0 |  | 1.2 | glossy Ni-0.5% Co | 2.0 |  |  |  |
| Example 7 | 0.25 | inner surface | 2.5 | 450° C. × 15 hours | 1.5 | semi-glossy Ni | 0.2 | DTR forming | ○ | ○ |
|  |  | outer surface | 2.5 |  | 1.5 | glossy Ni-10% Co | 0.5 |  |  |  |
| Example 8 | 0.40 | inner surface | 3.0 | 650° C. × 4 hours | 1.0 | glossy Ni | 0.5 | DI forming | ○ | ○ |
|  |  | outer surface | 3.5 |  | 1.0 | glossy Ni-2% Co | 3.0 |  |  |  |
| Example 9 | 0.25 | inner surface | 0.5 | 600° C. × 3 minutes | 0.0 | non-glossy Ni | 2.0 | deep-drawing forming | ○ | ○ |
|  |  | outer surface | 1.5 |  | 1.0 | glossy Ni | 0.5 |  |  |  |
| Example 10 | 0.40 | inner surface | 4.0 | 850° C. × 0.5 minutes | 1.5 | semi-glossy Ni | 1.0 | DI forming | ○ | ○ |
|  |  | outer surface | 4.0 |  | 1.5 | glossy Ni | 4.0 |  |  |  |
| Comparative Example 1 | 0.40 | inner surface | 3.0 | 500° C. × 5 hours | 1.0 | — | — | DI forming | (reference) | (reference) |
|  |  | outer surface | 3.0 |  | 1.0 | — | — |  |  |  |

(Runnability of Battery Case)

The runnability of a battery case was measured in such a manner that 100 of battery cases were placed on a belt conveyor, and the width was narrowed to pass only one of the battery cases where they had been conveyed with the belt conveyor. The case where the time for passing 100 battery cases was shorter than Comparative Example 1 was evaluated as "○". The results are shown in Table 1.

(Charging Characteristics of Battery)

An AA size alkaline manganese battery was produced by using the battery case. The battery thus produced was discharged through a load resistance of 2Ω, and a discharging time until a voltage of 0.9 V was measured. As a result, the case where the discharging time was equal to or longer than Comparative Example 1 was evaluated as "Ω". The results are shown in Table 1.

APPLICABILITY IN INDUSTRY

A battery case having glossy nickel plating or glossy nickel-cobalt alloy plating on the outermost layer on the outer surface obtained by a deep-drawing method, a DI-forming method or a DTR-forming method is good in runnability of the battery case, and operations of battery production can be smoothly carried out. The battery performance (discharging characteristics) is also good.

What is claimed is:

1. A surface treated steel plate for a battery case, comprising:
   a. a steel plate having a first surface and a second surface, wherein the first surface forms the inner surface of the battery case and the second surface forms the outer surface of the battery case;
   b. an iron-nickel diffusion layer formed as an uppermost layer on said first surface;
   c. a glossy nickel plating layer consisting of nickel formed as an uppermost layer on said second surface;
   d. a nickel layer formed as an intermediate layer at said second surface; and
   e. an iron-nickel diffusion layer between the nickel layer and the steel plate.

2. The surface-treated steel plate for a battery case of claim 1, wherein the nickel layer has a thickness from 0.01 to 3 μm.

3. The surface-treated steel plate for a battery case of claim 1, wherein the glossy nickel plating layer has a thickness from 0.5 to 4 μm.

4. A surface-treated steel plate for a battery case, comprising:
   a. a steel plate having a first surface and a second surface, said first surface forming the inner surface of the battery case and said second surface forming the outer surface of the battery case;
   b. an iron-nickel diffusion layer formed as an uppermost layer at said first surface;
   c. a nickel plating layer consisting of nickel formed as an uppermost layer at said second surface;
   d. a nickel layer formed as an intermediate layer at said second surface; and
   e. an iron-nickel diffusion layer between said nickel layer and said steel plate;
   wherein said nickel plating layer is either a non-glossy nickel alloy, a semi-glossy nickel plating or a glossy nickel plating.

5. The surface-treated steel plate for a battery case of claim 4, wherein the nickel plating layer has a thickness from 0.2 to 3 μm.

* * * * *